United States Patent
Ito et al.

(10) Patent No.: US 9,562,296 B2
(45) Date of Patent: Feb. 7, 2017

(54) PRODUCTION METHOD FOR SILICON NANOPARTICLES

(75) Inventors: Yasuhiko Ito, Kyotanabe (JP); Manabu Tokushige, Kyotanabe (JP); Tokujiro Nishikiori, Kyoto (JP); Hiroyuki Tsujimura, Kyoto (JP)

(73) Assignee: I'MSEP CO., LTD., Kyoto-shi, Kyoto (JP)

( * ) Notice: Subject to any disclaimer, the term of this patent is extended or adjusted under 35 U.S.C. 154(b) by 0 days.

(21) Appl. No.: 13/882,816

(22) PCT Filed: Oct. 18, 2011

(86) PCT No.: PCT/JP2011/073877
§ 371 (c)(1),
(2), (4) Date: May 1, 2013

(87) PCT Pub. No.: WO2012/060208
PCT Pub. Date: May 10, 2012

(65) Prior Publication Data
US 2013/0228469 A1    Sep. 5, 2013

(30) Foreign Application Priority Data
Nov. 2, 2010   (JP) .................................. 2010-246040

(51) Int. Cl.
*C25C 5/04* (2006.01)
*B22F 9/20* (2006.01)
(Continued)

(52) U.S. Cl.
CPC . *C25C 5/04* (2013.01); *B22F 9/20* (2013.01); *B82Y 30/00* (2013.01); *C01B 33/023* (2013.01);
(Continued)

(58) Field of Classification Search
CPC ................ C25C 5/02; C25C 5/04; B22F 9/20; C01B 33/023
See application file for complete search history.

(56) References Cited

U.S. PATENT DOCUMENTS 3,203,883 A * 8/1965 Maruyama ................ C21C 5/52
205/705
4,400,247 A * 8/1983 Ginatta ......................... 205/354
(Continued)

FOREIGN PATENT DOCUMENTS

JP    2001508130 A    6/2001
JP    2003129268 A    5/2003
(Continued)

OTHER PUBLICATIONS

International Search Report from PCT/JP2011/073877 dated Jan. 24, 2012.
(Continued)

*Primary Examiner* — Ciel Thomas
(74) *Attorney, Agent, or Firm* — Millen, White, Zelano and Branigan, P.C.

(57) ABSTRACT

Provided is a method for producing fine metal particles, wherein metal oxide powders can be used as a source of fine metal particles, and a method for producing fine metal particles can be provided avoiding the contamination of the molten salt electrolyte bath and the produced fine metal particles. A method for producing fine metal particles (112) is provided which comprises generating cathodic discharge outside and over the surface of an electrolyte bath (100) comprising metal oxide powders (110) suspended therein, whereby the metal oxide powders (110) are electrochemically reduced into the fine metal particles (112).

12 Claims, 2 Drawing Sheets

(51) Int. Cl.
*C01B 33/023* (2006.01)
*B82Y 30/00* (2011.01)
(52) U.S. Cl.
CPC ........ *C01P 2002/72* (2013.01); *C01P 2004/04* (2013.01); *C01P 2004/64* (2013.01)

(56) References Cited

U.S. PATENT DOCUMENTS

| | | | |
|---|---|---|---|
| 4,964,973 A * | 10/1990 | Donahue | C22B 4/005 204/241 |
| 5,227,045 A * | 7/1993 | Townsend | C23C 12/00 205/230 |
| 5,976,345 A | 11/1999 | Pal et al. | |
| 6,299,742 B1 | 10/2001 | Pal et al. | |
| 6,921,473 B2 | 7/2005 | Ward-Close et al. | |
| 7,264,765 B2 | 9/2007 | Ono et al. | |
| 8,529,749 B2 * | 9/2013 | Sankaran | 205/560 |
| 2003/0047462 A1 | 3/2003 | Ward-Close et al. | |
| 2003/0047463 A1 | 3/2003 | Ward-Close et al. | |
| 2003/0057101 A1 | 3/2003 | Ward Close et al. | |
| 2004/0237711 A1 | 12/2004 | Ono et al. | |
| 2005/0166706 A1 * | 8/2005 | Withers et al. | 75/10.23 |
| 2006/0110277 A1 | 5/2006 | Ward-Close et al. | |
| 2007/0131560 A1 | 6/2007 | Ratchev et al. | |
| 2009/0162237 A1 * | 6/2009 | Rakowski | C22C 38/38 420/38 |
| 2011/0158843 A1 | 6/2011 | Ward-Close et al. | |

FOREIGN PATENT DOCUMENTS

| | | |
|---|---|---|
| JP | 2003524073 A | 8/2003 |
| JP | 2004052003 A | 2/2004 |
| JP | 2007016293 A | 1/2007 |
| JP | 2007529631 A | 10/2007 |
| WO | 2005090640 A1 | 9/2005 |
| WO | 2005111272 A1 | 11/2005 |

OTHER PUBLICATIONS

English Translation Abstract for JP2007016293 dated Jan. 25, 2007.
Hiroyuki Kawamura, et al. "Discharge electrolysis in molten chloride: formation of fine silver particles" Elsevier, Plasmas & Ions (1998) 1, pp. 29-36.
Official Action related to corresponding Japanese Patent Application No. 2012-541802 dated Dec. 2, 2015.

* cited by examiner

PRODUCTION METHOD FOR SILICON NANOPARTICLES

FIELD OF THE INVENTION

The present invention is related to a method for producing fine metal particles, especially a method that uses molten salt electrolysis to produce fine metal particles.

BACKGROUND OF THE INVENTION

Plasma-induced discharge electrolysis using cathodic discharge is one practically available method for producing fine metal particles. In this method, metallic ions are dissolved in molten salt electrolyte to be reduced by the discharge electrons emitted from the cathode, to produce metal particles in the molten salt electrolyte.

This method uses molten salt electrolyte containing metallic ions. For example, a production method of fine metal particles using plasma-induced cathodic discharge electrolysis is described in WO 2005/111272 (Patent Document 1), for which the desired metallic ions are supplied by dissolving such metal nanoparticle sources as the metal oxide of the corresponding element for the desired metal nanoparticle in the molten salt electrolyte. It also describes to place an anode in molten salt electrolyte, which consists of the corresponding element for the desired metal nanoparticle, to provide with metallic ions for the molten salt by electrochemical anodic dissolution of the anode in the molten salt electrolyte.

H. Kawamura, K. Moritani, and Y. Ito, Plasmas & Ions, 1, 29-36 (1998) (Non-Patent Document 1) describes the production method of fine silver particles using plasma-induced cathodic discharge electrolysis. For supplying silver ions in the molten salt electrolyte, silver chloride as the halide containing the silver element was added and chemically dissolved in the electrolyte.

On the other hand, Japanese Unexamined Patent Application Publication No. 2007-16293 (Patent Document 2) describes how the metal is deposited on the cathode by electrochemical reduction of the metal oxide powders that contact the surface of the cathode immersed in molten salt electrolyte in which metal oxide powders are suspended.

PRIOR ART DOCUMENTS

Patent Documents

Patent Document 1: WO 2005/111272
Patent Document 2: Japanese unexamined patent application publication No. 2007-16293

Non-Patent Documents

Non-Patent Document 1: H. Kawamura, K. Moritani, and Y. Ito, Plasmas & Ions, 1, 29-36 (1998).

SUMMARY OF THE INVENTION

Problems to be Solved by the Invention

The production method of fine metal particles, which is described in Non-Patent Document 1, used metallic halide as a soluble compound in the molten salt electrolyte. Therefore, we must separately prepare the metallic halide of the corresponding element for the desired metal nanoparticle. When cheap and accessible metal oxide particles are used for the metal nanoparticle source, the molten salt composition is severely limited since chemical dissolution of the oxide in molten salt is required.

The production method of fine metal particles described in Patent Document 1 also needs to use an anode material that consists of the corresponding element for the desired metal nanoparticle. It is difficult to supply metallic ions to molten salt by anodic dissolution of only metal oxide powders.

On the other hand, the production method described in Patent Document 2 deposits the desired metal film on the cathode because the metal oxide powder, which is suspended in the molten salt electrolyte, are electrochemically reduced on the surface of the cathode immersed in the electrolyte. Therefore, it is difficult to obtain fine metal particles of high uniformity from the deposited metal film. The component of the cathode material may also contaminate the deposited metal.

As described above, the conventional method, which uses cheap and accessible metal oxide powder, has many problems for producing metal particles using plasma-induced cathodic discharge electrolysis.

The present invention provides a method for producing fine metal particles that can use metal oxide powders as a metal nanoparticle source without contaminating the produced fine metal particles.

Means for Solving the Problems

The inventors have made every effort and have invented a new method for producing fine metal particles, especially for nanoparticles. This method electrochemically reduces the metal oxide powders that are suspended in the molten salt electrolyte to prepare an electrolyte bath by discharge electrons using plasma-induced cathodic discharge electrolysis.

According to the present invention, a method for producing fine metal particles is provided which comprises generating cathodic discharge outside and over the surface of an electrolyte bath comprising metal oxide powders suspended therein, whereby the metal oxide powders are electrochemically reduced into the fine metal particles.

Metal oxide powders are easily accessible compared with those of bulk metal or the metal halide of the corresponding element for the desired metal nanoparticles. The limitation imposed on the composition of molten salt is reduced compared with the chemical dissolution of metal oxide powders in the molten salt, since it is only required to suspend the metal oxide powders in the electrolyte.

Fine metal particles can be easily collected because metal oxide powders are electrochemically reduced by the discharge electrons at the melt's surface to produce fine metal particles, whereby the metal is not electrodeposited on the cathode's surface. The contamination from the cathode material to the fine metal particles can also be decreased.

In this way, metal oxide powders can be used as a fine metal particle source, and a method for producing fine metal particles can be provided avoiding the contamination of the molten salt electrolyte bath and the produced fine metal particles.

According to the present invention, it is preferred that the metal oxide powders are reduced while stirring the electrolyte bath.

In this way, the reduction of the metal oxide powders uniformly proceeds.

According to the present invention, the method for producing fine metal particles comprises the steps of (a) providing a molten salt bath; (b) suspending the metal oxide powders in the molten salt electrolyte bath; (c) placing an anode in the electrolyte bath; (d) placing a cathode above the electrolyte bath at a short distance spaced apart from the surface of the electrolyte bath, (e) applying a DC voltage across the anode and the cathode to generate cathodic discharge between the cathode and the surface of the electrolyte bath whereby the metal oxide powders are electrochemically reduced.

Metal oxide powders, suspended in the molten salt electrolyte bath, can be reduced by discharge electrons generated between the cathode and the surface of the electrolyte by applying a DC voltage across the anode and the cathode.

Reduction of the metal oxide powders can uniformly proceed because the metal oxide powders are easily suspended and dispersed in the molten salt electrolyte.

By placing the cathode outside and over the electrolyte's surface without immersing it in the electrolyte bath, the produced fine metal particles and the molten salt electrolyte are protected from contamination coming from the cathode material. Fine metal particles are also easily collected because they are produced in the electrolyte and the metal is not electrodeposited on the cathode.

In this way, metal oxide powders can be used as a fine metal particle source, and a method for producing fine metal particles with low contamination can be provided.

According to the present invention, it is preferred that the metal species of the metal oxide powders are selected from the group consisting of silicon, titanium, tantalum, niobium, iron, cobalt, nickel, aluminum and tungsten.

According to the present invention, it is preferred that the content of the metal oxide powders in the electrolyte bath is between 0.1 to 20% by weight of the molten salt bath.

At less than 0.1% by weight of metal oxide content in the molten salt electrolyte, the supply of the metal oxide powders to the reduction field is less and their reduction does not smoothly proceed. On the other hand, at more than 20% by weight of metal oxide content, electrolysis control is difficult, because the metal oxide powders are not suspended in the electrolyte and the viscosity of the molten salt electrolyte is increased. These problems can be avoided by using the electrolyte bath in which the content of the metal oxide powders is between 0.1 to 20% by weight of the molten salt bath.

According to the present invention, it is preferred that the metal oxide powders have an average diameter between 0.5 nm and 100 μm.

In this way, metal oxide powders can be uniformly suspended and dispersed in the molten salt electrolyte, resulting in high uniformity of composition and size of the obtained particles.

According to the present invention, it is preferred that the molten salt bath comprises at least one alkaline metal halide, selected from the group consisting of LiF, NaF, KF, RbF, CsF, LiCl, NaCl, KCl, RbCl, CsCl, LiBr, NaBr, KBr, RbBr, CsBr, LiI, NaI, KI, RbI, and CsI, or at least one alkaline-earth metal halide selected from the group consisting of $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, and $BaI_e$.

According to the present invention, it is preferred that the temperature of the electrolyte bath is between 300° C. and 1000° C.

At temperatures lower than 300° C., the options of the molten salt composition are severely limited, and structure improvement of the anode and the electrolytic cell is needed to maintain adequate productivity due to a lower current density as the anodic reaction rate decreases. On the other hand, at temperatures higher than 1000° C., for example, the material options for the equipment for electrolytic cells are severely limited, and practical operations face many problems. Therefore, by fixing the temperature of the electrolyte bath between 300° C. and 1000° C., fine metal particles can be produced with wide latitude for molten salt compositions and equipment materials.

According to the present invention, it is preferred that the temperature of the electrolyte bath is between 400° C. and 700° C.

Effects of the Invention

As described above, according to the present invention, metal oxide powders can be used as a fine metal particle source to provide a method for producing fine metal particles with low contamination of the molten salt electrolyte and the produced particles.

DESCRIPTION OF THE PREFERRED EMBODIMENT

Now the first embodiment of the present invention will be described by making reference to the drawings.

Figure 1:
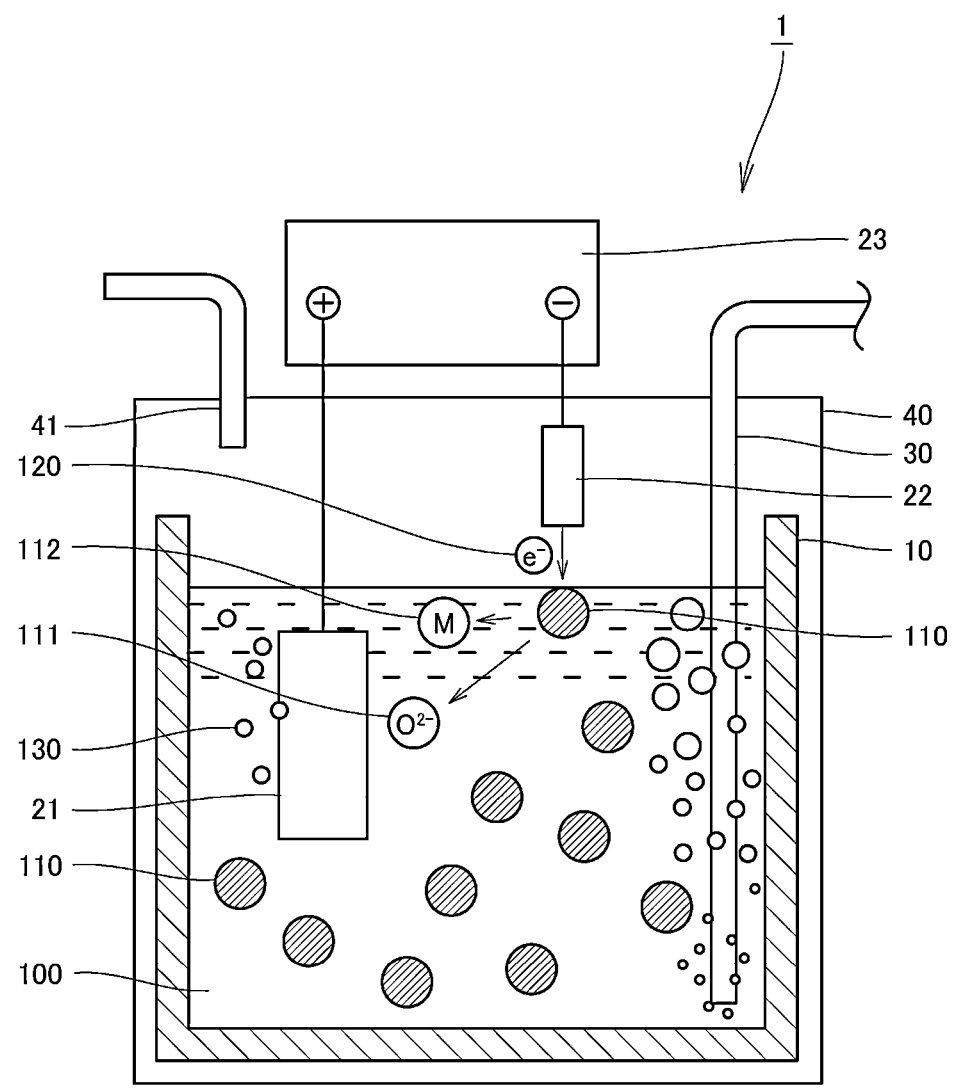
FIG. 1 schematically shows an electrolysis apparatus used in an embodiment of the present invention.

FIG. 1 shows an electrolysis apparatus 1 for carrying out the production method of fine metal particles 112 in accordance with an embodiment of the present invention. The electrolysis apparatus 1 includes an electrolytic vessel 10, molten salt electrolytic bath 100, an anode 21, a cathode 22, a power supply 23 connected to the anode 21 and the cathode 22, an Ar gas supply 30, and a container 40 maintained with an Ar gas atmosphere. The electrolyte bath 100 contains a molten salt and metal oxide powders 110. The metal oxide powders 110 are suspended in the molten salt electrolyte bath 100. Fine metal particles 112 are produced in the electrolyte bath 100.

First, the metal oxide powders 110 suspended in the molten salt electrolyte bath 100 are explained. They are not limited to specific metal oxide powders 110 provided that they are reduced electrochemically to the corresponding metal particles. It is preferred that the metal species of the metal oxide powders 110 is selected from the group consisting of silicon, titanium, tantalum, niobium, iron, cobalt, nickel, aluminum and tungsten. The purity of the metal oxide powders 110 is not limited, either. To obtain fine metal particles 112 with high purity, using metal oxide powders 110 with higher purity is recommended. Their crystallinity is also not limited. For example, single crystal or amorphous metal oxide can be used.

The amount of metal oxide powders 110 suspended in the molten salt electrolyte bath 100 are not limited if the reduction of the metal oxide powders 110 proceeds. It is preferred that the content of the metal oxide powders in the electrolyte bath is between 0.1 to 20% by weight of the molten salt bath. At less than % by weight of the metal oxide powder 110 content in the molten salt electrolyte, the supply of the metal oxide powders 110 to the reduction field just under the cathode 22 is less and its reduction does not smoothly proceed. On the other hand, at more than 20% by weight of metal oxide powder 110 content, the electrolysis control sometimes becomes difficult, because the metal oxide powders 110 are not suspended and accumulated at the bottom of the melt 100. This situation increases the viscosity of the electrolyte bath 100. These problems can be avoided by using the electrolyte bath in which the content of the metal oxide powders is between 0.1 to 20% by weight of the molten salt bath. When electrolysis is continuously conducted, the metal oxide powders 110 are recommended to be replenished in response to the electrolysis progress, not all at once.

Although the size of the metal oxide powders 110 suspended in the electrolyte bath 100 needs to be coordinated depending upon their density, it is preferred that the metal oxide powders have an average diameter between 0.5 nm and 100 µm. In this way, the metal oxide powders can be uniformly suspended and dispersed in the molten salt electrolyte, and the uniformity of the composition and the sizes of the obtained particles can be enhanced. When the average diameter of the metal oxide powders 110 is too large, it is difficult to reduce their internal regions. Since large powders tend to easily accumulate, uniform suspension and dispersion of them are difficult. On the other hand, small metal oxide powders 110 tend to fly as dust in the atmosphere or float on the electrolyte's surface 100. This complicates their supply to the electrolyte bath 100; a separate step is needed to prepare loosely compressed pellets of metal oxide powders 110.

Next, molten salt, which is an electrolyte bath 100, is described. It is preferred that the molten salt bath comprises at least one alkaline metal halide, selected from the group consisting of LiF, NaF, KF, RbF, CsF, LiCl, NaCl, KCl, RbCl, CsCl, LiBr, NaBr, KBr, RbBr, CsBr, LiI, NaI, KI, RbI, and CsI, or at least alkaline-earth metal halide selected from the group consisting of $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, and $BaI_2$. These compounds can be used alone or as a mixture thereof. The salt mixture and composition are not limited and can be chosen based on the desired operation temperature.

When metal oxide powders 110 with high density are used, molten salt with higher density should be used to avoid the accumulation of metal oxide powders 110 in the electrolyte bath 100 resulting in a difficult suspension.

Although the temperature of the electrolyte bath 100 can be coordinated depending upon to the species of the desired metal or the composition of the molten salt, it is preferred that the temperature of the electrolyte bath is between 300° C. and 1000° C., and it is more preferred that the temperature of the electrolyte bath is between 400° C. and 700° C. At lower temperature, the options of the molten salt composition are severely limited, and structure improvement of the anode and the electrolytic cell is needed to maintain adequate productivity due to the lower current density as the anodic reaction rate decreases. On the other hand, at higher temperature, the material options for the equipment of the electrolytic cells are severely limited, and practical operation has many problems.

Next, the anode 21, the cathode 22 and the power supply 23 are described. The cathode (discharge electrode) 22 is the same as the one used in common plasma-induced cathodic discharge electrolysis. Tungsten is mentioned as an example.

At the anode 21, an oxide ion 111 generated in the electrolyte bath 100 by reducing the metal oxide powders 110 is oxidized, and the oxygen gas evolves. Therefore, a conventional oxygen evolution anode 21 used in conventional molten salt electrolysis, for example, conductive ceramic such as nickel ferrite or conductive diamond can be used. Here, at the low concentration of oxide ion 111 in the electrolyte bath 100 at an early stage of the electrolysis period if such molten chloride as LiCl—KCl for an electrolyte is used and, if the applied current is too larger than the electrolytic current that can be used only by the oxidation of the oxide ion, chlorine gas may evolve at the anode 21 to consume the anode 21. Therefore, it is preferable to use graphite (or glassy carbon) depending upon the anodic reaction, or to provide the oxide ion 111 preliminarily in the electrolyte bath 100 by adding lithium oxide or calcium oxide so that the oxygen gas evolves at the anode 21 even from the beginning of electrolysis.

As described above, in the method for producing fine metal particles 112 according to the present invention, it is preferred that the electrolyte bath 100 contains such alkaline metal oxide or alkaline-earth metal oxide as lithium oxide or calcium oxide. In this way, oxide ion can be provided in the electrolyte bath 100, and the oxygen gas can evolve at the anode 21 even from the beginning of electrolysis. In this case, because the carbon anode is consumed, using an inert oxygen evolution anode, such as nickel ferrite, is recommended.

The power supply 23 applies a DC voltage across the anode 21 and the cathode 22 to generate discharge between the cathode 22 and the surface of the electrolyte bath 100 whereby the metal oxide powders are electrochemically reduced.

Next, the argon gas supply 30 and the container 40 that is maintained with an argon gas atmosphere are described. The argon gas supply 30, which introduces argon gas to the electrolyte bath 100 to stir it, is one example of a stirring means. Other stirring means include inert gas supply such as argon or nitrogen gas supply into the melt, a mechanical stirring means using impellers or a stirrer adapted to high temperature with a magnetic stirrer enclosed with glass or ceramic, or an application of MHD convection.

In a container 40 maintained by an argon gas atmosphere, the circumference of the electrolyte bath 100 and the cathode 22 is maintained under an argon gas atmosphere. For instance, the container 40 maintained with an argon gas atmosphere consists of a box covering the entire electrolyte bath 100 and the cathode 22. The container 40 maintained with an argon gas atmosphere includes a gas outlet 41. Argon gas, which is introduced from the argon gas supply 30 in the container 40 maintained with an argon gas atmosphere, is vented outside of the container 40 maintained with an argon gas atmosphere by the gas outlet 41.

The production step is described that uses the above production equipment 1 of fine metal particles 112 in FIG. 1.

The method for producing fine metal particles 112 comprises the steps of (a) providing a molten salt bath; (b) suspending the metal oxide powders 110 in the molten salt electrolyte bath 100; (c) placing an anode 21 in the electrolyte bath 100; (d) placing a cathode 22 above the electrolyte bath 100 at a short distance spaced apart from the surface of the electrolyte bath 100, (e) applying a DC voltage across the anode 21 and the cathode 22 to generate cathodic discharge between the cathode 22 and the surface of the electrolyte bath 100 whereby the metal oxide powders 110 are electrochemically reduced. Steps (a) to (f) can be conducted in any order. Several steps can also be simultaneously conducted.

The electrolyte bath 100, which contains molten salt and the suspended metal oxide powders 110, is stirred by argon gas introduced from the argon gas supply 30, and metal oxide powders 110 are frequently supplied to the surface of the electrolyte bath 100 just under the cathode 22. Here, the metal oxide powders 110 is electrochemically reduced by the discharge electrons 120 emitted from the cathode 22 to the surface of the electrolyte bath 100 to produce oxide ion 111 and fine metal particles 112. The oxide ion 111 is oxidized at the anode 21, and the oxygen gas 130 evolves.

After termination of the application of the voltage across the anode 21 and the cathode 22, the fine metal particles 112 produced in the electrolyte bath 100 are collected with salt. The solidified salt is removed by a water washing, and fine metal particles 112 are obtained.

As described above, the present invention provides a method for producing fine metal particles 112 comprising generating cathodic discharge outside and over the surface of an electrolyte bath 100 comprising metal oxide powders 110 suspended therein, whereby the metal oxide powders 100 are electrochemically reduced into the fine metal particles 112.

The present invention also provides a method for producing fine metal particles 112 comprising the steps of (a) providing a molten salt bath; (b) suspending the metal oxide powders 110 in the molten salt electrolyte bath 100; (c) placing an anode 21 in the electrolyte bath 100; (d) placing a cathode 22 above the electrolyte bath 100 at a short distance spaced apart from the surface of the electrolyte bath 100, (e) applying a DC voltage across the anode 21 and the cathode 22 to generate cathodic discharge between the cathode 22 and the surface of the electrolyte bath 100 whereby the metal oxide powders 100 are electrochemically reduced.

The production equipment 1 of the fine metal particles 112 can reduce the metal oxide powders 110 by applying the DC voltage and the current across the anode 21 and the cathode 22 to generate the discharge electrons between the cathode 22 and the surface of the electrolyte bath 100.

Metal oxide powders 110 can be more accessible compared with those of bulk metal or metal halide of the corresponding element for the desired metallic nanoparticles 112. The limitation imposed on the composition of molten salt is reduced compared with the chemical dissolution of the metal oxide powders 110 in the electrolyte bath 100, because it is only needed to suspend the metal oxide powders 110 in the electrolyte bath 100. The reduction of the metal oxide powders 110 uniformly proceeds because the powders are easily suspended and dispersed in molten salt electrolyte bath 100.

Contamination from the cathode 22 material to the fine metal particles 112 decreases, because the metal oxide powders 110 are electrochemically reduced by the cathodic discharge at the surface of the electrolyte bath 100, and they are not reduced at the surface of the cathode 22 immersed in the electrolyte bath 100. Collecting fine metal particles 112 is easy because they are produced in the electrolyte bath 100 and are not electrodeposited on the cathode 22.

In this way, metal oxide powders 110 can be used as a source of fine metal particles 112, and their production method can be provided while avoiding the contamination of the molten salt electrolyte bath 100 and the produced fine metal particles 112.

In the method for producing fine metal particles 112, reduction of the metal oxide powders 110 uniformly proceeds by stirring the molten salt electrolyte bath 100.

EXAMPLE

It was confirmed that fine metal particles 112, especially nanoparticles, are formed by the method producing fine metal particles 112 in accordance with the present invention as follows.

As a preparation step of a molten salt (a), a eutectic mixture of LiCl—KCl (200 g) was melted at 450° C. under a 0.1 MPa argon atmosphere. As a preparation step of the electrolyte by suspending the metal oxide powders (b), 3.0 g of silicon dioxide powders ($SiO_2$, 325 mesh) were added and suspended in molten salt under agitation by argon gas bubbling. As a set step of the anode in the melt (c), anode consisting of glassy carbon rod was immersed in the melt. As a set step of the cathode outside and over the electrolyte's surface (d), the cathode (discharge electrode) consisting of tungsten rod was placed outside and over the electrolyte's surface. In step (e), the plasma-induced cathodic discharge electrolysis (1.0 A, 20,000 C) was conducted in the above electrolyte. Finally, the produced particles in the electrolyte were collected with the salt, and the solidified salt was removed by a water washing to obtain produced particles.

Figure 2:
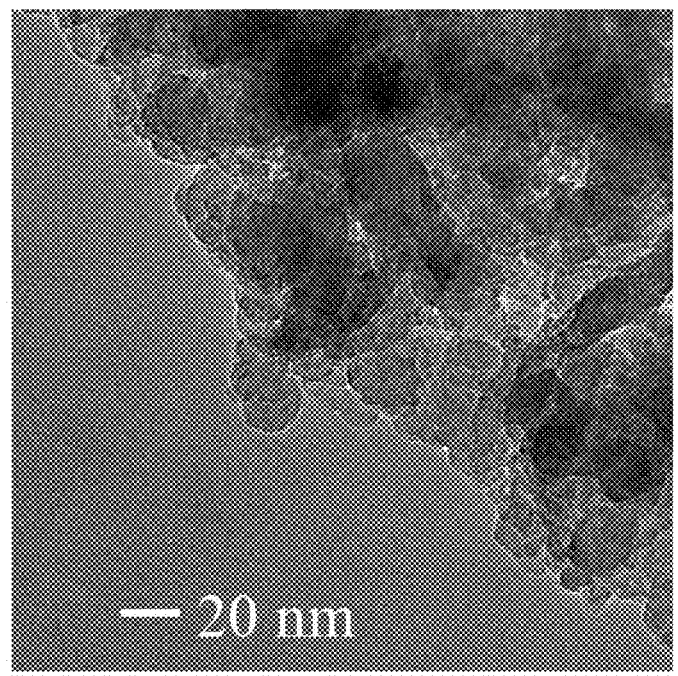
FIG. 2 shows a TEM photograph of the fine metal particles produced in accordance with an embodiment of the present invention.

As shown in FIG. 2, nanoparticles with diameters of around a few tens nm were observed in a TEM photograph.

Figure 3:
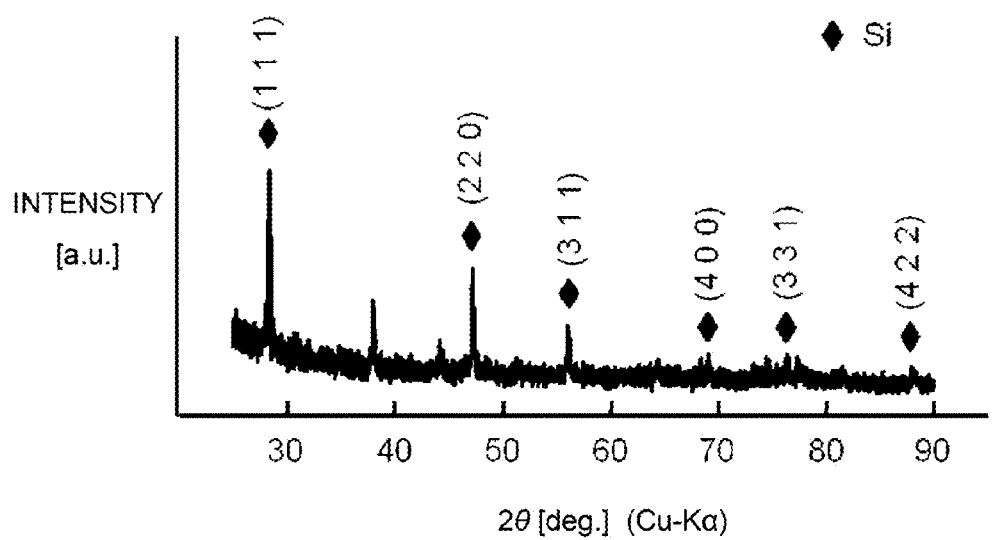
FIG. 3 shows an XRD pattern of the fine metal particles produced in accordance with an embodiment of the present invention.

As shown in FIG. 3, the diffraction pattern showing silicon crystal was observed in the XRD measurement result, confirming that silicon dioxide powders were electrochemically reduced by discharge electrons to produce silicon nanoparticles.

The above description is provided for the purpose of describing embodiments of the invention and is not intended to limit the scope of the invention in any way. It will be apparent to those skilled in the art that various modifications and variations can be made without departing from the spirit or scope of the invention. Thus, it is intended that the present invention covers the modifications and variations of this invention provided they come within the scope of the appended claims and their equivalents.

EXPLANATION OF REFERENCE NUMERALS

21: Anode, 22: Cathode, 100: Electrolyte, 110: Metal oxide powders, 112: Fine metal particles.

The invention claimed is:

1. A method for producing silicon nanoparticles comprising:
   providing a molten salt electrolyte bath comprising an alkali metal halide, an alkaline earth metal halide or a mixture thereof, and containing silicon dioxide powders suspended therein;
   adding alkaline metal oxide or alkaline earth metal oxide to said electrolyte bath;
   placing a cathode above said electrolyte bath at a short distance spaced apart from a surface of said electrolyte bath;
   placing an inert oxygen evolution anode comprising conductive ceramic or conductive diamond in said electrolyte bath;
   electrically connecting said cathode and said anode to a DC power source;
   applying a DC voltage across said cathode and said anode through said electrolyte bath to generate cathodic discharge between said cathode and the surface of said electrolyte bath such that said silicon dioxide powders are electrochemically reduced to silicon nanoparticles;

recovering the silicon nanoparticles produced in said electrolyte bath with the salt from said electrolyte bath; and recovering the solidified salt by a water washing to obtain the produced silicon nanoparticles.

2. The method according to claim 1 wherein the electrochemical reduction of said silicon dioxide powders are carried out while stirring said electrolyte bath.

3. The method according to claim 1 wherein said electrolyte bath contains said silicon dioxide powders at a concentration from 0.1 to 20% by weight of said molten salt.

4. The method according to claim 1 wherein said silicon dioxide powders have an average diameter from 0.5 nm to 100 μm.

5. The method according to claim 1 wherein said molten salt electrolyte comprises a eutectic melt of LiCl and KCl containing said silicon dioxide suspended therein.

6. The method according to claim 1 wherein said cathodic discharge is generated in the atmosphere of argon.

7. A method for producing silicon nanoparticles comprising:

providing a molten salt electrolyte bath comprising an alkali metal halide, an alkaline earth metal halide or a mixture thereof, and containing a silicon dioxide powders suspended therein;

adding alkaline metal oxide or alkaline earth metal oxide to said electrolyte bath;

placing a tungsten cathode above said electrolyte bath at a short distance spaced apart from the surface of said electrolyte bath;

placing an inert oxygen evolution anode comprising conductive ceramic or conductive diamond in said electrolyte bath;

electrically connecting said cathode and said anode to a DC power source;

applying a DC voltage across said cathode and said anode through said electrolyte bath to generate cathodic discharge between said cathode and the surface of said electrolyte bath such that said silicon dioxide powders are electrochemically reduced to silicon nanoparticles;

recovering the silicon nanoparticles produced in said electrolyte bath with the salt from said electrolyte bath; and recovering the solidified salt by a water washing to obtain the produced silicon nanoparticles.

8. The method according to claim 7 wherein the electrochemical reduction of said silicon dioxide powders are carried out while stirring said electrolyte bath.

9. The method according to claim 7 wherein said electrolyte bath contains said silicon dioxide powders at a concentration from 0.1 to 20% by weight of said molten salt.

10. The method according to claim 7 wherein said metal oxide silicon dioxide powders have an average diameter from 0.5 nm to 100 μm.

11. The method according to claim 7 wherein said molten salt electrolyte comprises a eutectic melt of LiCl and KCl containing said silicon dioxide suspended therein.

12. The method according to claim 7 wherein said cathodic discharge is generated in the atmosphere of argon.

* * * * *